Sept. 9, 1958

W. G. MILLER 2,850,861

SELF PROPELLED SWATHER

Filed Jan. 27, 1955

INVENTOR:
William G. Miller
by James E. Nilles
Attorney

Sept. 9, 1958

W. G. MILLER 2,850,861

SELF PROPELLED SWATHER

Filed Jan. 27, 1955

INVENTOR:
William G. Miller
by James E. Nilles
Attorney

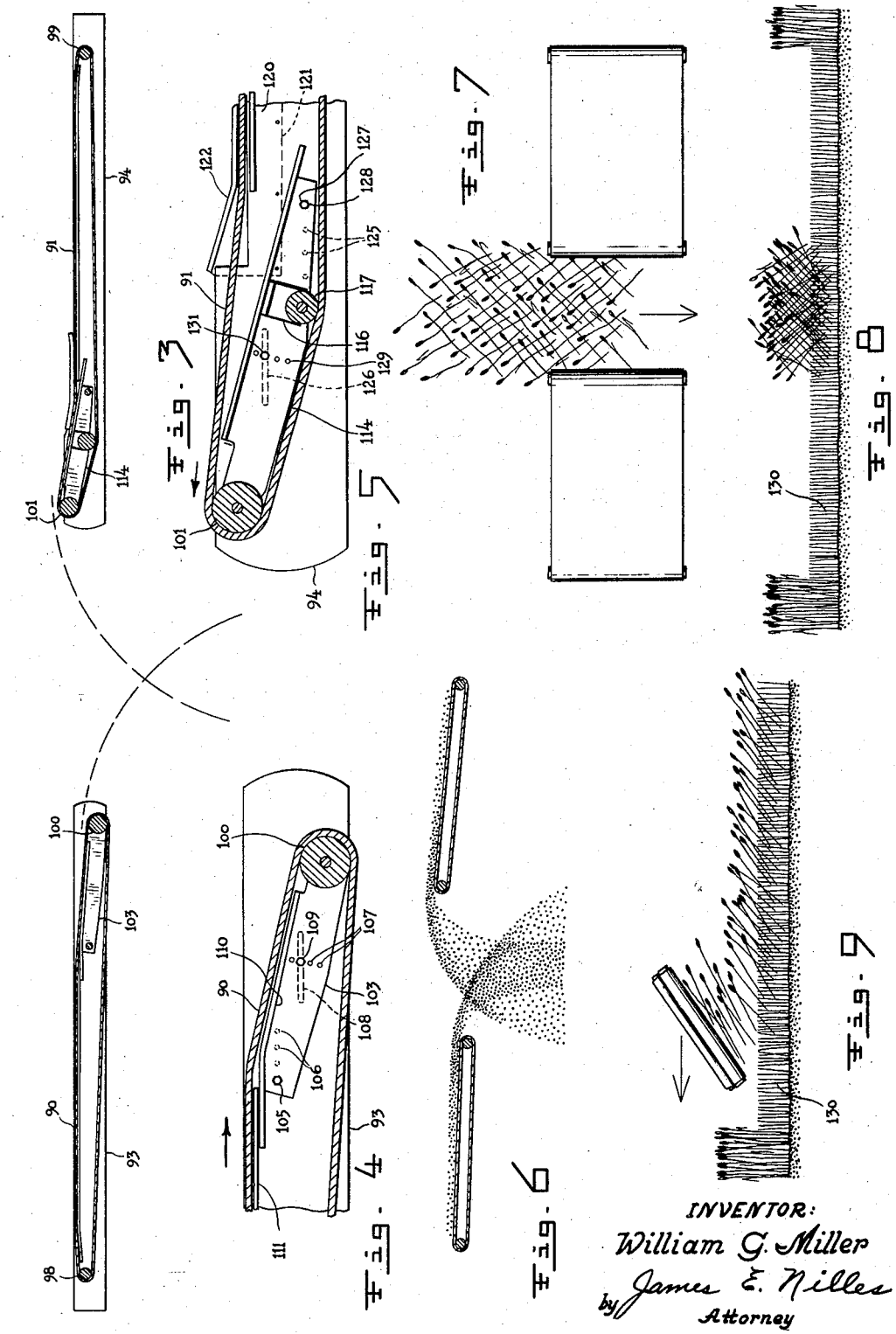

United States Patent Office 2,850,861
Patented Sept. 9, 1958

2,850,861

SELF PROPELLED SWATHER

William G. Miller, Toronto, Ontario, Canada, assignor to Massey-Ferguson Inc., a corporation of Maryland Application January 27, 1955, Serial No. 484,525

4 Claims. (Cl. 56—23)

This invention relates to agricultural machines such as swathers or windrowers. More particularly, it is concerned with windrowers of the center delivery type.

A object of this invention is to provide an improved center-delivery type swather having a pair of rearwardly inclined conveyor aprons which discharge into a common central opening, the inner ends of said conveyors being adjustable relative to one another as to their discharge height from the ground.

A general object of this invention is to provide a swather of the center delivery type which delivers the two streams of crop material to a central discharge opening and deposits them in a swath of improved pattern.

It is an object of this invention to provide an improved center delivery swather capable of forming a swath which throughout its width is of substantially uniform density and head distribution and has an improved crisscross pattern, while at the same time positioning the heads of the crop material uppermost in the swath in such manner, whereby the grain will dry quickly and uniformly, and be able to better withstand any tendency to settle in the stubble.

Other objects and advantages will become more apparent as this disclosure progresses, reference being had to the accompanying drawings in which:

Fig. 3 is an elevational view, on an enlarged scale, of the apron conveyors, taken on line 3—3 of Fig. 2.

Fig. 4 is an elevational sectional view, on a further enlarged scale, of a portion of the left conveyor apron and its adjusting means, taken on line 4—4 of Fig. 1.

Fig. 5 is an elevational sectional view, on the same scale as Fig. 4, of a portion of the right conveyor apron and its adjusting means, taken on line 5—5 of Fig. 1.

Fig. 6 is an elevational sectional view of a modification of the conveyor aprons shown in Fig. 3, on a reduced scale.

Fig. 7 is a more or less schematic plan view, on a reduced scale, of the conveyor aprons showing the swath pattern.

Fig. 8 is a front elevational view of the swath shown in Fig. 7.

Fig. 9 is a side elevational view showing the conveyors and manner in which the crop is deposited on the stubble.

Figure 1:
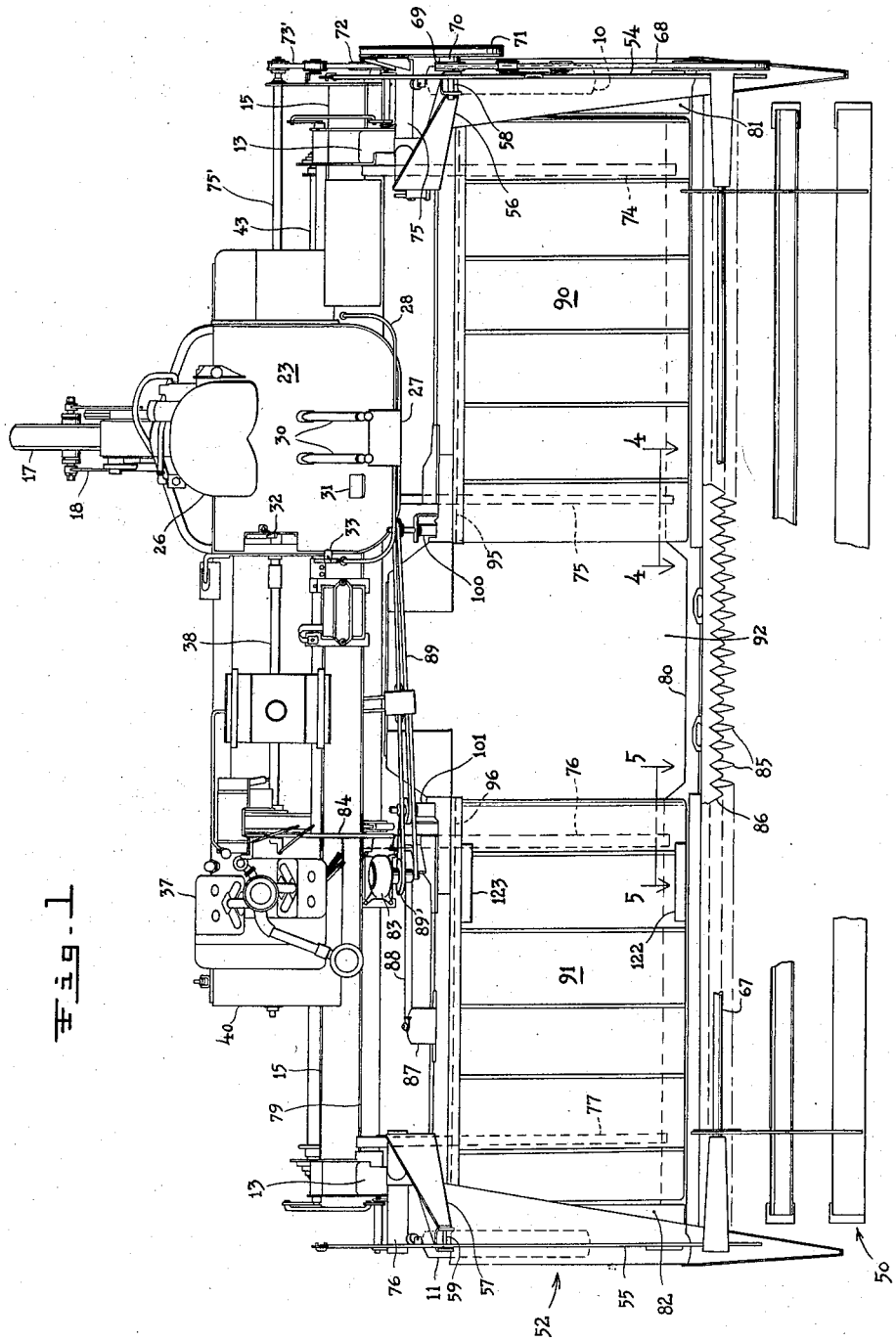
Fig. 1 is a plan view of a self-propelled swather which embodies this invention, certain parts being broken away for sake of clarity in the drawings.

Referring now more particularly to the drawings, the embodiment chosen for purposes of illustrating this invention is a self-propelled windrower which is supported by the two forward traction wheels 10, 11 rotatably mounted at the lower ends of frame members 13. Members 13 are secured to either end (Fig. 1) of the tubular backbone member 15 which is the main support member of the frame. A rear steering wheel 17 constitutes a third point of support and is located to one side of the centerline of the machine to avoid running over the deposited crop. The wheel bracket 18, in which wheel 17 is mounted, is secured to post 19 rotatably supported on the frame portion 21. An operator's platform 23 is supported on the mid-frame portion between the wheels and has mounted thereon a seat 26, control panel 27, guide rail 28, steering levers 30, parking brake 31, variable traction speed control lever 32 and a reel control lever 33.

An internal combustion engine 37 is provided for propelling the windrower and for driving its component parts. The engine 37 drives the main drive shaft 38 which has a planetary gear (not shown) at either end for driving each of the traction wheels 10, 11. One planetary system is located in gear box 40 (Fig. 1), while the other (not shown) is located under the operator's platform. Each planetary system has a brake and either traction wheel may be independently driven in the reverse direction for turning "square" corners in the well known manner. Shaft 38 is drivingly connected through a pair of layshafts 43 (only one shown) and a pair of layshafts 44 (only one shown), one of each mounted on opposite sides of the main frame, by conventional sprockets and chains 45, 46, 47 to the traction wheels.

A harvesting reel 50 is located above the forward edge of the table 52 and rotatably mounted on the forward ends of support arms 54, 55 which are pivotally secured to the upwardly extending brackets 56, 57 by pins 58, 59 respectively. The rear ends of support arms 54, 55 are each pivotally connected with an adjustable link 61 (Fig. 2), the lower ends of which are pivotally connected to levers 62. Levers 62 are secured to tube 79 which is rotatably secured between members 13. Rotation of tube 79 by the hydraulic cylinder and piston 63 acting through crank 64 and link 66 vertically positions both table 52 and reel 50. Adjusting means for the reel is provided and is conventional and as it forms no part of this invention further description is deemed unnecessary. It is sufficient to say that the reel is manually adjustable by control lever 33 as to its height from the table and serves to hold the crop material against the sickle 86 while being cut and then depositing the crop on the table with the grain head to the rear. The large pulley 66 which is secured to reel shaft 67 is driven by the belt 68. V-belt 68 is trained over a small pulley 69 secured to shaft 70 which in turn is driven by the large pulley 71 receiving its power from the pulley 72 through belt 73. Shaft 71', on which pulley 72 is secured, is driven through its other pulley 72' by belt 73' trained around pulley 74' secured to an extension shaft 75' of the drive shaft 38.

Figure 2:
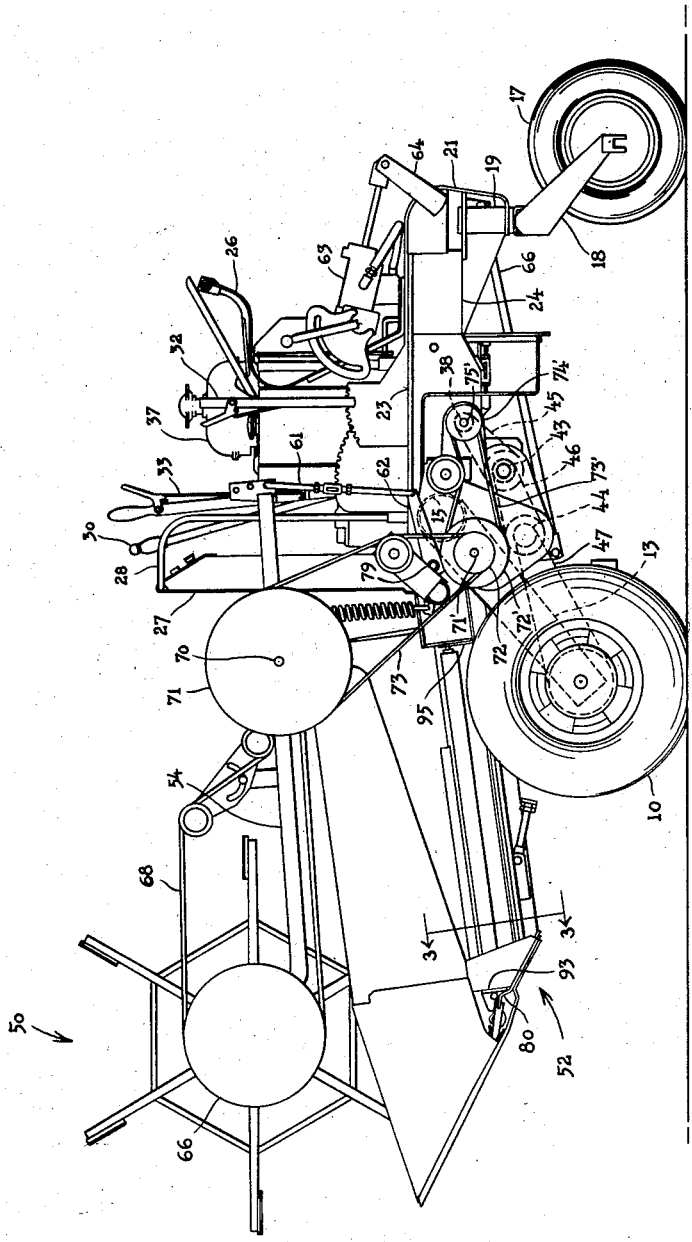
Fig. 2 is a left elevational view of the swather shown in Fig. 1, showing the table in the raised position.

The table as shown in Fig. 2 is in the transport position but is pivotally secured at its rear side to the main frame, as will appear hereinafter, and when it is in the operative position is inclined upwardly to the rear at various angles depending on the stand and conditions of the crop. By so inclining the table, the heads of the grain, which as previously mentioned, are positioned to the rear on the table, fall to the ground upon discharge through the central opening in the table subsequent to their butt ends. The heavier head ends also have a tendency to carry farther inwardly upon discharge and therefore form a crisscross pattern; in other words, the material in the two crop streams tend to interlace.

In prior art structures the grain heads have a tendency to be concentrated in the middle of the swath formed, i. e. the heads are not evenly distributed throughout the width of the swath. This makes the central portion of the swath heavier and when the crop cannot be harvested soon enough due, for instance, to prolonged rainy weather, the swath actually becomes lower in the center portion and fails to be supported on the stubble. When such a condition occurs, water tends to collect in this "trough" and prevents the grain from drying. Also in prior art windrowers of the center delivery type, as the two crop streams are discharged into the common central opening they collide in midair and often fall to the ground in a haphazard manner. The mass of material so formed is incapable of supporting itself on the top of the stubble and it is to these particular problems that this invention, hereinafter described, relates.

The table 52 extends across the full width of the machine and its frame has four laterally spaced rearwardly extending arms 74, 75, 76, 77 (Fig. 1) underneath which are secured at their rear ends to tube 79 for oscillation therewith. A wide support plate 80 forms the forward side of the table frame and extends across the entire machine and the forward ends of arms 74, 75, 76 and 77 are rigidly secured thereto. Members 81, 82 are secured at either end of plate 80 and extend rearwardly therefrom forming the sides of the table frame. Rear table frame members comprising vertically positioned plates 95, 96 rigidly connect side members 81, 82 with their respective support arms 74, 75 and 76, 77. The cutting mechanism is conventional and comprises sickle guards 85 secured along the length of plate 80, and a sickle 86 reciprocated therein and driven by the swaybar 87 and pitman 88 which in turn is driven by gear box 83. Gear box 83 receives its power from drive shaft 38 through belt 84. A conveyor drive belt 89 is driven from the gear box pulley 89' and drives rollers 100, 101 to be described.

An endless apron 90, 91 is provided at either end of table 52, the upper flights of which travel laterally inwardly towards the center of the machine for discharge of the crop carried thereby into the central discharge opening 92 between the inner ends of the spaced conveyors. Conventionally, in this type of swather, these conveyors lie in a common transverse plane and discharge their respective crop material on a common plane. However, in accordance with this invention, the conveyors do not lie in a common plane, for purposes which will appear more fully hereinafter. As shown in Figs. 3 to 9 the crop streams from their respective conveyors are discharged into the central opening at different levels or at different heights relative to the ground. Referring more particularly to Fig. 3, the table frame also has vertically disposed plates 93, 94 which are secured to the front plate 80 in fore and aft alignment with the similar plates 95, 96 respectively, previously mentioned. The outer conveyor rollers 98, 99 of aprons 90, 91 respectively, are rotatably supported by their respective front plates 93, 94 and the corresponding rear plates 95, 96. In the embodiment of the invention shown in Fig. 3 the inner driven conveyor rollers 100, 101 are mounted for vertical swinging movement. Roller 100 is rotatably mounted between a pair of swinging arms 103 (only one shown) which are pivotally and adjustably mounted on plate member 93 and its corresponding rear plate 95. As front and rear arms 103 and their connections to plates 93 and 95 are similar, only one will be described. Arm 103 is pivotally attached to plate 93 by a bolt and nut means 105 which is positionable in a series of apertures 106 in plate 93. Thus the roller 100 is positionable in a transverse direction. The arm 103 has a series of apertures 107 which are registerable with a slot 108 in plate 93. A bolt and nut means 109 extends through slot 108 and its registering aperture 107 to secure the roller 100 in any one of a series of vertical positions from a generally horizontal position and on downwardly. The arm 103 has a rearwardly turned flange 110 for supporting the edge of the apron 90 and overlaps with a similar flange 111 secured to plate 93.

The means for upwardly swinging the inner driven roller 101 of apron 91 is somewhat similar to that used for roller 100. Here, however, the arm 114 on plate 94 and its corresponding arm (not shown) on rear plate 96 have a bracket 116 secured thereto. An idler roller 117 is rotatably mounted between these brackets. By this idler roller means the lower flight of apron 91 runs smoothly even in the uppermost position of roller 101. When the roller 101 is in the uppermost position means are also provided to keep the upper run of apron 91 on the support or guide flange 120. This means takes the form of a plate 121 secured to the side of plate 94 and having an inwardly turned hold-down flange 122. A similar plate and flange 123 is provided for vertical plate 96, as shown in Fig. 1. These flanges 122 and 123, extend inwardly over the apron 91 and keep it on its guides 120 and in alignment. Means are also provided for laterally positioning the pair of arms 114 for adjusting the lateral position of the inner roller 101. Plates 94 and 96 each have a series of apertures 125 extending therethrough and also a slot 126. Arms 114 each have an aperture 127 registerable with apertures 125 through which passes a bolt 128. Arms 114 each also have a series of apertures 129 which are selectively held in register with slot 126 by means of bolt 131.

Thus the inner rollers 100, 101 are vertically positionable by their respective pairs of arms 103, 114 in a downwardly and upwardly direction, respectively, from the table proper and are also each adjustably positionable in a lateral direction. A considerable degree of adjustment is thereby provided for the inner ends of the conveyors in both a transverse and vertical direction.

Conventionally, when the two crop streams are discharged on a common horizontal plane they tend to collide in mid-air at the center of the opening and then fall to the ground in a jumbled mass.

However, by having the two laterally inwardly moving crop streams discharge into a common opening at different levels, in a swather of the inclined conveyor type, a very desirable swath pattern is obtained. The crop material in each of the streams has a vertical component of direction at the time they begin to merge into a single crop stream. As a result, there is a smooth flow of the crop streams, or merger, into one another (Figs. 3 and 6).

The difference in discharge heights of the crop streams for the best swath pattern is variable and depends on the condition of the crop, thickness of the stand, and height of cut. Furthermore, it is desirable to be able to adjust the width of the discharge opening depending on the thickness of the stand. For instance, in a light crop, the opening would be narrowed so as to insure a heavy enough swath for proper supporting ability on the stubble tops. Conversely, in a very heavy stand, a wide opening would be used in order to spread the swath out for proper aeration.

A modification of the invention is shown in Fig. 6 wherein the entire conveyor is inclined in a transverse direction rather than just the inner or discharge end. Obviously one, or both, of the conveyors may be inclined or one conveyor may be at a different level altogether from the other conveyor. The end result would be the same, i. e., to discharge the two streams at different heights in order to insure that they are moving downwardly before commencing to merge into a single stream.

As shown in Fig. 7, the grain heads are distributed fairly evenly throughout the width of the swath and evenly interlaced, or crisscrossed, over the width of the swath.

Fig. 8 further illustrates how the grain ends of the straw tend to carry farther when discharged from the conveyor than the butt ends of the straw.

Fig. 9 shows the inclined position of the conveyors when in the operating position and resulting in the butt ends sinking into the stubble and the grain ends resting on and above the stubble.

It should now be apparent that an improved windrower has been provided which lays a swath of a very desirable pattern.

I claim:

1. A harvesting table adapted to be mounted on a swather and inclined rearwardly in an upward direction in respect to swather movement in a harvesting direction, said table including a pair of laterally spaced endless apron conveyors for feeding movement toward the lateral center of said table, the inner ends of said conveyors defining the opposite sides of a central discharge opening and positioned at different discharge levels relative to the ground, means mounted on said swather including a motor for imparting feed movements to said conveyors.

2. A device as defined in claim 1 further characterized in that said inner ends of said conveyors are adapted to be adjustable in a transverse direction relative to one another.

3. A swather of the type comprising a harvesting table frame inclined upwardly from the forward edge of the swather, a cutting mechanism secured to and extending along the forward edge of said frame above ground level, a pair of laterally spaced endless apron conveyors carried by said frame so that the inner ends of said conveyors define the opposite sides of a central discharge opening, and a reel overlying said cutting mechanism and adapted to deposit crop material severed by said cutting mechanism onto said conveyors, characterized by the provision of means for supporting said inner conveyor ends at different vertical distances from the ground level so that crop material discharged by the conveyors through said opening will merge smoothly into a single crop stream of substantially uniform density.

4. The device as defined in claim 3 further characterized in said last named means being effective to permit both vertical and transverse adjustment of the inner conveyor ends so that crops of varying thickness, height, and condition can be readily accommodated by the swather.

References Cited in the file of this patent

UNITED STATES PATENTS

| | | |
|---|---|---|
| 1,014,448 | Camp et al. | Jan. 9, 1912 |
| 1,444,743 | Haiss | Feb. 6, 1923 |
| 1,607,105 | Singer | Nov. 16, 1926 |
| 2,530,668 | Tallman | Nov. 21, 1950 |
| 2,677,225 | Ommodt | May 4, 1954 |